United States Patent
Bessey et al.

(12)

(10) Patent No.: US 6,306,483 B1
(45) Date of Patent: Oct. 23, 2001

(54) RESILIENT THREE-DIMENSIONALLY SHAPED FIBER NETWORKS WITH IMPROVED COMFORT AND AESTHETIC PROPERTIES, IMPROVED METHOD OF MAKING SAME AND ARTICLES CONTAINING SAME

(75) Inventors: William E. Bessey; Joseph S. W. Hass, both of Charlotte, NC (US); Harold W. Davis, Gaffney, SC (US)

(73) Assignee: North Carolina State University, Raleigh, NC (US)

( * ) Notice: Subject to any disclaimer, the term of this patent is extended or adjusted under 35 U.S.C. 154(b) by 0 days.

(21) Appl. No.: 08/878,762

(22) Filed: Jun. 19, 1997

(51) Int. Cl.$^7$ ................................ B32B 1/00; B32B 7/00
(52) U.S. Cl. ........................ 428/175; 428/167; 428/178
(58) Field of Search ................................. 428/141, 175, 428/116, 118, 119, 174, 59, 179–180, 212, 221; 442/60, 205, 304

(56) References Cited

U.S. PATENT DOCUMENTS

| | | |
|---|---|---|
| 3,434,478 | 3/1969 | Liebowitz et al. . |
| 3,981,310 | 9/1976 | Donaghy . |
| 4,128,684 * | 12/1978 | Bomio et al. ........................ 428/175 |
| 4,631,221 | 12/1986 | Disselbeck et al. . |
| 4,667,490 | 5/1987 | Patel . |
| 4,890,877 | 1/1990 | Ashtiani-Zarandi et al. . |
| 5,158,821 | 10/1992 | Gebauer et al. . |
| 5,282,871 * | 2/1994 | Yamane et al. ........................ 8/155.6 |
| 5,364,686 | 11/1994 | Disselbeck et al. . |
| 5,447,776 | 9/1995 | Disselbeck . |
| 5,870,785 * | 2/1999 | Hoorens ................................ 5/652.1 |

FOREIGN PATENT DOCUMENTS

| | | |
|---|---|---|
| 0 324 714A | 7/1989 | (EP) . |
| 0 728 859A | 8/1996 | (EP) . |
| 96/31336 | 10/1996 | (WO) . |
| 97/24916 | 7/1997 | (WO) . |

OTHER PUBLICATIONS

Database WPI, Section Ch. Week 9423, Derwent Publications Ltd., London, GB; Class A3, An 94–189439 XP002074756 & JP 06 128837 A.

* cited by examiner

Primary Examiner—Newton Edwards
(74) Attorney, Agent, or Firm—Jenkins & Wilson, P.A.

(57) ABSTRACT

A three-dimensionally shaped fiber network structure having both resiliency and improved softness and aesthetic properties is composed of a deformed textile fabric formed from at least one monofilament and at least one multifilament yarn and having a plurality of deformations formed as a two-dimensional array in a base region of the deformed textile fabric. The deformed textile fabric is preferably a knitted or a woven fabric. The network structure is made by forming a deformable fabric from the monofilament and the multifilament yarn and then subjecting the deformable fabric to an area-enlarging deformation process, e.g., a thermomechanical process, to produce the deformed textile fabric having the deformations formed in a base region thereof. The three-dimensional network structures may be used in a variety of articles, including cushioning materials, impact-absorbing materials, and load-bearing materials.

37 Claims, No Drawings

RESILIENT THREE-DIMENSIONALLY SHAPED FIBER NETWORKS WITH IMPROVED COMFORT AND AESTHETIC PROPERTIES, IMPROVED METHOD OF MAKING SAME AND ARTICLES CONTAINING SAME

BACKGROUND OF THE INVENTION

This invention relates to fiber network structures. More particularly, this invention relates to three-dimensionally shaped fiber network structures which are resilient and have improved softness, comfort and aesthetic properties. The present invention further relates to improved methods of making such network structures and to articles containing such structures.

The shaping or molding of textiles into three-dimensional structures is well known in the art. Examples include the shaping of felt hats, the molding of upholstery fabrics to conform to the shapes of chairs, and permanent press treatments. In most applications, the softness and comfort of traditional textile materials is desirable. Consequently, molded fabrics are usually soft and drape well.

Methods for shaping or molding textile materials to form three-dimensional structures are disclosed, for example, in U.S. Pat. Nos. 3,434,478; 3,981,310; 4,667,490; 4,128,684; 4,631,221; 4,890,877; 5,364,686; 5,158,821; and 5,447,776.

U.S. Pat. Nos. 3,434,478; 3,981,310 and 4,667,490 disclose the addition of small-diameter monofilament yarns to lingerie fabrics to improve shape retention in molded brassiere cups. The monofilaments taught in these references have denier values of from 16 to 25, which corresponds to diameters of from 40 to 50 microns.

U.S. Pat. No. 4,128,684 discloses pleated or corrugated fabrics for use in air conditioning heat exchangers and chemical reactors. These fabrics are formed from woven fabrics containing both multifilament and monofilament yarns. The fabrics are pleated or corrugated to provide continuous open flow channels parallel to the fabric surface. The multifilament fabric provides controlled capillary flow across the fabric. The monofilament yarns are stiff enough to hold the channels open provided they have been adequately heatset in the pleated configuration. Ideally, the monofilaments are heated above their softening temperatures so that the bond to adjacent fibers assures fabric stability. While these fabrics have adequate stiffness to make the flow channels self-supporting, the pleated structure is a poor load-bearing structure. Pleated structures characteristically collapse by returning to their flat configuration. This form of collapse is catastrophic, that is, once the yield load has been exceeded, the compression modulus turns negative and total collapse is inevitable.

Three-dimensionally shaped fiber network structures made from textile fabrics which have been impregnated with a thermoset polymer and then molded into the desired shape are disclosed, for example, in U.S. Pat. Nos. 4,631,221; 4,890,877; 5,158,821; and 5,447,776.

The properties of three-dimensionally shaped fiber network structures derived from conventional textile-type yarns depend primarily on the type and quantity of thermoset resin used. The more resin that is used, the stiffer the network. In general, such three-dimensional structures tend to be stiff and brittle, and are intended for use mainly as lightweight structural materials. These three-dimensional structures suffer yield and permanent deformation if compressed beyond 10 to 20%.

Three-dimensional fiber network structures have also been formed using multifilament yarns with two thermoplastic polymers of different melting temperatures, wherein bonding is achieved by melting only the lower melting temperature thermoplastic polymer. Such a structure is taught, for example, in U.S. Pat. No. 5,364,686. However, such fiber network structures tend to be stiff and to suffer permanent deformation when compressed beyond 10 to 20%.

More recently, resin-free three-dimensional network structures have been developed which are based on large-diameter monofilaments. Reference is made, for example, to copending, commonly assigned U.S. patent application Ser. No. 08/577,655 to Kim et al., filed Dec. 22, 1995. Such fiber network structures consist essentially of thermoplastic polymer monofilaments having a diameter of at least about 0.1 millimeter. These structures have the flexural durability of traditional textile fabrics and the stiffness of large-diameter monofilaments. In addition, such structures have excellent resilience and cushioning properties. Unfortunately, the stiffness of the monofilaments which is essential to the cushioning and recovery of such network structures also gives the structures a harsh, rough hand. Thus, these structures tend to be uncomfortable against the skin. Another drawback of such structures is that they have little ability to control the movement of air or water.

Accordingly, one object of this invention is to provide a three-dimensionally shaped fiber network structure which has both resiliency and a softer, more pleasant touch or hand.

A further object of this invention is to provide a three-dimensionally shaped fiber network structure which has good cushioning properties in addition to resiliency and a softer, more pleasant touch or hand.

Another object of this invention is to provide a three-dimensionally shaped fiber network structure which has the aforementioned properties and also the capacity to selectively transport water from one side of the structure to the other side thereof.

An additional object of this invention is to provide a method of making a three-dimensionally shaped fiber network structure which has the properties set forth in the foregoing objects.

A still further object of this invention is to provide articles composed of three-dimensionally shaped fiber network structures having the properties set forth in the preceding objects.

These and other objects which are achieved according to the present invention can be readily discerned from the following description.

SUMMARY OF THE INVENTION

The present invention is based on the discovery that a three-dimensionally shaped fiber network structure which is resilient and has a softer, more pleasant touch or hand, improved aesthetic properties, good cushioning properties and the capacity to selectively transport water from one side of the structure to the other side of the structure, can be obtained if the structure is composed of a fabric which has been formed from a multifilament yarn and a monofilament.

Accordingly, one aspect of the present invention is directed to a three-dimensionally shaped fiber network structure composed of a deformed textile fabric having a base region and a plurality of deformations formed as a two-dimensional array on the base region, wherein the deformed textile fabric contains at least one monofilament and at least one multifilament yarn.

A second aspect of the present invention is directed to a method of making the three-dimensionally shaped fiber network structure described above, which broadly involves the steps of:

(1) providing at least one monofilament and at least one multifilament yarn;

(2) subjecting the monofilament and the multifilament yarn to a fabric-forming process so as to form a deformable textile fabric therefrom; and (3) subjecting the deformable textile fabric to an area-enlarging deformation process so as to produce a deformed textile fabric having a base region and a plurality of deformations formed as a two-dimensional array on the base region, thereby forming the three-dimensionally shaped fiber network structure of the invention.

A further aspect of this invention is directed to articles incorporating the three-dimensionally shaped fiber network structures of this invention.

The fiber network structures of this invention are not only resilient but also are improved in terms of comfort, aesthetics and functionality. In addition, the network structures of this invention have greatly enhanced insulating capability as compared to conventional three-dimensionally shaped fiber network structures. Furthermore, the fiber network structures of this invention have a high capacity to selectively transport water from one side of the structure to the other side.

DETAILED DESCRIPTION OF THE INVENTION

As stated above, the present invention provides a resilient three-dimensionally shaped fiber network structure having improved softness and aesthetic properties, a method of making such network structure, and articles composed of the structure.

The three-dimensionally shaped fiber network structure of this invention is composed of a deformed textile fabric having a base region and a plurality of deformations formed as a two-dimensional array on the base region. The deformed textile fabric in the network structure of this invention contains at least one multifilament yarn and at least one monofilament. The fiber network structure of this invention has an open-mesh, filigree-like structure.

As used herein, the term "deformations" is meant to include projections and/or depressions formed on the base region by means of an area-enlarging process which increases the surface area of the deformable fabric, i.e., the deformed fabric has a greater surface area than the deformable fabric from which it was formed. During the area-enlarging deformation (shaping) process, portions of the base region of the deformable fabric undergo stretching so as to form the deformations therein. After the area-enlarging deformation process, the stretched nature of the deformations of the base region causes the base region to have a larger surface area than the corresponding base region of the original deformable fabric. However, although the area-enlarging deformation process increases the surface area of the base region of the deformable fabric, the deformation process does not change the length or width of such base region.

As stated above, the deformations in the structure of this invention are stretched structures as opposed to, e.g., corrugations which are not stretched but merely folded structures. The deformations can extend from the base region of the deformed fabric by a distance of several times the thickness of the fabric.

As used herein, the term "projections" refers to portions of the deformed textile fabric which extend upwardly from the base region of the deformed fabric. The term "depressions" is used herein to refer to portions of the deformed textile fabric which extend downwardly from the base region into the deformed textile fabric. The direction in which the depressions extend is substantially opposite to the direction in which the projections extend.

As stated above, the deformations are formed as a two-dimensional array on the base region. With respect to the deformations formed on the base region, the term "two-dimensional array" as used herein means that the multiple deformations are disposed both along the length and along the width of the plane of the base region. The deformations may be arranged on the base region in a non-uniform or uniform pattern. Preferably, the deformations are arranged on the base region in a repetitive pattern or uniform pattern with uniform spacing.

In the fiber network structure of this invention, the deformed textile fabric is preferably either a knitted fabric or a woven fabric. Knitted fabrics are drapable and can be readily deformed without excessive elongation of individual fibers, which can lead to breakage of the fibers. Woven fabrics can be readily produced from large-diameter monofilaments.

The monofilament used to form the deformed textile fabric in the fiber network structure of this invention preferably has a diameter of at least about 0.10 millimeter, more preferably from about 0.10 to about 1.00 millimeter, most preferably from about 0.125 millimeter to about 0.70 millimeter.

The multifilament yarn used to form the deformed textile fabric in the fiber network structure of this invention preferably has a denier of from about 50 to about 3000, more preferably from about 70 to about 1500.

The filaments in the multifilament yarn used in the present invention can be in the form of staple fibers in a spun yarn or in the form of textured or non-textured continuous filaments.

Continuous multifilament yarns which can be used in the present invention preferably contain from about 20 to about 200 filaments and preferably have a denier per filament (dpf) value of from about 1 to about 15 denier.

Staple fiber yarns are produced by secondary spinning from relatively short filament sections as present in natural fibers (such as, e.g., cotton or wool) or in synthetic staple fibers. Continuous filament fiber yarns consist of continuous man-made synthetic-polymer (e.g., polyester) or natural-polymer (e.g., regenerated cellulose) filaments. The yarns can be textured, i.e., they may have a more or less pronounced crimp and they may be twisted or twistless.

The monofilament and the filaments present in the multifilament yarn may be composed of the same or different materials. A preferred polymer for use in either or both of the monofilament and the filaments of the multifilament yarn is composed of a single thermoplastic polymer or copolymer (or, optionally, a polymer blend or alloy) which preferably melts at a temperature in the range of from about 80° C. to about 375° C., more preferably in from about 150° C. to about 350° C.

Preferred classes of thermoplastic polymers which can be used to form the monofilament and/or the multifilament yarn used in the present invention include, for example, polyesters, polyamides, thermoplastic copolyetherester elastomers, polyarylene sulfides, polyolefins, aliphatic-aromatic polyamides, polyacrylates, and thermotropic liquid crystalline polymers.

Preferred polyesters include the polyesters of alkylene glycols having from about 2 to about 10 carbon atoms and aromatic diacids. Polyalkylene terephthalates, especially polyethylene terephthalate and polybutylene terephthalate are particularly preferred. Also preferred are polyalkylene naphthalates, which are polyesters of 2,6-naphthalenedicarboxylic acid and alkylene glycols, such as, for example, polyethylene naphthalate.

Preferred polyamides are nylon 6 and nylon 66, which are commonly used in making fibers.

The preferred polyarylene sulfide is polyphenylene sulfide.

The preferred polyolefins are polyethylene and polypropylene.

The preferred aliphatic aromatic polyamides include polyamides derived from terephthalic acid and 2-methyl-1,5-pentanediamine.

The preferred thermotropic liquid crystalline polymers include polyesters derived from 6-hydroxy-2-naphthoic acid and 4-hydroxybenzoic acid.

Specific preferred polymers for use in the monofilament and/or filaments of the multifilament yarn used in the present invention include polyethylene terephthalate ("PET"), thermoplastic copolyetherester elastomers, nylon 6, nylon 66, polypropylene, polybutylene terephthalate ("PBT"), and polyethylene.

PET is widely available from many manufacturers, including Hoechst Celanese Corporation, Somerville, N.J. The PET should have a molecular weight high enough to make the PET suitable for spinning into fibers. Generally, the PET should have a molecular weight corresponding to an intrinsic viscosity (I.V.) of at least about 0.6 dl/gram, wherein the I.V. is determined by measuring the relative viscosity of a 4% solution (weight/volume) in o-chlorophenol at 25° C. The relative viscosity is then converted into intrinsic viscosity.

Polypropylene, nylon 6 and nylon 66 are also widely available from many manufacturers.

Preferably, the thermoplastic polymers are converted into the filament of the monofilament and/or the filaments of the multifilament yarn by a melt spinning process.

The filaments of the multifilament yarn may also be wet- or dry-spun, man-made fibers composed of non-thermoplastic materials, such as, e.g., rayon, acrylic, cellulose acetate, and the like.

The filaments of the multifilament yarn may also be natural fibers, such as, for example, cellulose fibers or protein fibers. Examples of suitable cellulose fibers include cotton, jute, flax, and hemp fibers. Suitable protein fibers include, e.g., wool and silk.

As stated above, the monofilament and the filaments of the multifilament yarn may be composed of the same material, e.g., the same thermoplastic polymer, such as, for example, polyethylene terephthalate. The monofilament and the filaments of the multifilament yarn may also be composed of different materials. Since the monofilament and the multifilament yarn perform different functions in the fiber network structure of this invention, the material chosen for the monofilament and the material chosen for the filaments of the multifilament yarn should each be chosen with the end-use of the final product in mind, based on known principles and economics.

The polymers may also include minor amounts of one or more other additives, such as, for example, spinning lubricants, antibacterial agents, flame retardants, antifungicidal agents and the like.

The fabric formed from the monofilament and multifilament yarn preferably contains from about 25% to about 90% by weight of the monofilament and from about 10% to about 75% by weight of the multifilament yarn. More preferably, the fabric contains from about 40% to about 85% by weight of the monofilament and from about 15% to about 60% by weight of the multifilament yarn.

The deformations present in the fiber network structure of this invention have an open-mesh, filigree-like appearance. Three-dimensionally shaped fiber network structures which have deformations like those which can be present in the structure of the present invention are disclosed, e.g., in U.S. Pat. Nos. 5,158,821; 5,447,776; 4,631,221; and 5,364,686; each of which are hereby incorporated by reference herein.

The network structure of this invention is resilient, i.e., the deformations substantially recover their shape after being compressed to 50% of their height. However, there may be minor changes in the shapes of the deformations, such as, for example, a change in the curvature of the edges at the top of the projection and/or depression.

The deformations in the fiber network structure of this invention can be in the shape of ellipses, cones or truncated cones, pyramids or truncated pyramids on different polygonal bases, cylinders, prisms, spherical elements and the like. The deformations may have a circular or polygonal base, or may be bar-shaped. Furthermore, deformations disposed on a common base region of a deformed textile fabric formed in the present invention can vary in shape from one another, i.e., the deformations on a particular base region do not all have to be the same shape.

Preferably, the apex points or top surfaces of projections define a first surface, which is a plane parallel to the plane of the base region of the deformed textile fabric from which the projections extend. Similarly, the apex points or bottom surfaces of depressions, if present, preferably define a second surface, which is also preferably a plane parallel to the plane of the base region. As a result, the preferred three-dimensional networks of this invention have two surfaces or planes, one being defined by the top surfaces of the projections and the other being defined by either the base region of the textile fabric or the bottom surfaces of the depressions.

Furthermore, as mentioned previously herein, the deformations are arranged on the base region as a two-dimensional array.

Depending on the use thereof, the fiber network structure of this invention may have a variety of deformations. Specifically, the shapes, heights, sizes and spacings of the deformations can be modified to suit a specific application. For example, the deformations may be modified to conform to a specific shape, e.g., an elliptical shape.

The shapes of the deformations depend on the process used to make them. For example, in a deformation process in which the textile fabric is held against a plate with round holes and a cylindrical rod is pushed through the hole on the same side as the textile fabric so that the textile fabric is stretched and forced into the hole, the resulting projections made in the textile fabric will be in the shape of truncated cones (i.e., the base and top of the projections will both be round), with the diameter of the top of the cone being the diameter of the rod that pushes the textile through the hole. Similarly, if a plate with square holes and a rod with a square cross section are used, the projections will be in the shape of truncated pyramids.

Corrugated or pleated geometries, which are formed by folding rather than by an area-enlarging process, are undesirable for the fabrics of this invention because corrugated or pleated geometries are unstable under forces perpendicular to the direction of the folds. Under compression, the corrugated structure is characterized by yield followed by a negative compression modulus, that is, after a relatively small deformation, typically 5% to 10%, the structure collapses completely under load, returning to their original flat shape. The structure may recover from collapse but will be prone to flex fracture at the fold line.

As stated hereinabove, the present invention is further directed to a method of making the three-dimensionally shaped fiber network structure of this invention. Broadly, the method of this invention involves the steps of:

(1) providing the aforementioned at least one monofilament and at least one multifilament yarn;

(2) subjecting the monofilament and the multifilament yarn to a fabric-forming process so as to form the aforementioned deformable textile fabric therefrom; and (3) subjecting the deformable textile fabric to an area-enlarging deformation process so as to produce the aforementioned deformed textile fabric having a base region and a plurality of deformations formed as a two-dimensional array on the base region, thereby forming the three-dimensionally shaped fiber network structure.

As mentioned previously herein, the textile fabric used in the present invention is preferably a knitted or woven fabric. Thus, in the method of this invention, the fabric-forming process is preferably either knitting or weaving.

After the fabric-forming process of step (2) is carried out, the resulting deformable textile fabric is then subjected to an area-enlarging deformation process, whereby a plurality of deformations are impressed into a base region of the deformed fabric.

As used herein, the term "area-enlarging" with respect to the process carried out in step (3) of the method of this invention refers to the enlarging of the surface area of the base region of the deformable fabric in which such deformations are formed, as was discussed previously herein.

The deformation process carried out in step (3) of the method of this invention involves deforming the textile fabric formed in step (2) into the desired shape at a temperature high enough that the fibers can be permanently deformed, as would occur, e.g., in a fiber drawing process. The deformation is preferably brought about using a thermomechanical process, wherein a mechanical force is applied to the deformable fabric at an elevated temperature. The mechanical force can be applied using numerous methods, such as, e.g., solid phase pressure forming, vacuum bladder match plate molding, interdigitation, deep drawing, use of a heated mold, and the like. Heat and pressure are applied for a sufficient time that the textile fabric is permanently deformed, but not for such a long time or at such a high temperature (e.g., well above the softening temperature) that the filaments coalesce. Such coalescence of the filaments would cause the shaped fiber network to lose its resilience.

Upon deformation of the deformable textile fabric, the meshes of the fabric open to give a filigree-like network. Because of the open structure of the textile fabric and the large void volume within the deformations, the fiber network structure of this invention has a low density compared with the polymer (generally less than about 10%, preferably less than about 5%) based on the amount of space occupied by the network. Air and other fluids can flow through the fiber network structure with little resistance.

The filaments in the three-dimensional network structure of this invention retain much of their individual fiber-like appearance and properties.

As stated previously herein, the deformations formed in step (3) of the method of this invention may include projections and/or depressions, as these terms are defined previously herein. In one preferred embodiment of the network structure of this invention, the deformations are made up of projections. In another preferred embodiment, the deformations include both projections and depressions.

The multifilament yarn which determines the surface characteristics of the three-dimensional fiber network of this invention can be added as a laminate or as a double knit fabric. One way to modify the surface characteristics involves laminating a conventional textile fabric to the monofilament textile fabric and then thermomechanically deforming the laminate to form a three-dimensional network.

The present invention further provides articles containing the three-dimensionally shaped fiber network structures of this invention.

Because of its properties, the three-dimensionally shaped fiber network structures of this invention are useful as cushioning and padding materials and as impact-absorbing materials. Specifically, the fiber network structures of this invention are load-bearing, dimensionally stable, lightweight, durable and breathable. In addition, the fiber network structures of this invention are springy and compressible, such that when a compressive force is removed, the materials return to their original shape (i.e., they are resilient). The fiber network structures of this invention can be compressed repeatedly without a significant loss in properties.

The sizes, heights, shapes and spacings of the pattern of the deformations affect the cushioning properties and "feel" of the three-dimensional network structures of this invention. The rigidity of the individual fibers in the network structure is also a major factor in determining the cushioning properties of the three-dimensional structures, and the rigidity of the fibers in turn depends on the diameter of the filaments and the kind of materials (e.g., polymers) from which the filaments are made.

The spacing, size, height, and shape of the projections and/or depressions, the diameter of the filaments, and fabric construction are chosen to give the desired cushioning properties for the specific application.

Thus, depending on the stiffness of the fibers and the sizes of the projections, the network structures of this invention may be used as cushioning materials, as impact absorbing materials, or as load-bearing materials.

The fiber network structures of this invention can be used as components or sub-components in numerous applications, including mattresses, mattress topper pads, infant mattresses and mattress covers to prevent suffocation, footwear, (sock liners, collar linings, and midsoles for shoes), pads for protective head gear, seat cushions such as, for example, automobile seats, wrappings for medical casts, protective braces, protective helmet liners, space/sound barriers for wall partitions and panels, protective packaging for electronics, automotive headliners which provide head cushioning and channels for wiring, liners for athletic and outdoor clothing, carpet pads, liners for women's brassieres and men's athletic supporters, and cushions for outdoor furniture, which dry easily and do not retain moisture.

The following non-limiting examples illustrate the present invention.

EXPERIMENTAL

EXAMPLE 1

A 70 denier 20 filament cellulose acetate yarn was knit along with a single 0.15 mm diameter polyethylene terephthalate (PET) monofilament having a denier of approximately 220. In the knitting process, the multifilament and monofilament yarns passed through the knitting needles simultaneously. The resulting knitted material was an 11 gauge, 16 course per inch plain jersey fabric having a thickness of about 0.32 millimeters (mm) and containing about 76% by weight of the monofilament and about 24% by weight of the multifilament yarn. During the knitting process, the small-diameter cellulose acetate fibers had spread so as to surround the coarse monofilament, thereby giving the knitted fabric a soft, luxurious surface hand or touch.

The knitted fabric then underwent an area-enlarging deformation process to form a three-dimensionally shaped fiber network structure. The deformation process involved pressing the fabric between a square array of 0.25 inch diameter rods and a matching array of ⅜ inch diameter holes. The array spacing was 0.5 inch. As stated above, the fabric initially had a thickness of 0.32 mm. After the deformation process, the resulting network structure had a thickness of 5.1 mm, which represented a sixteen-fold increase over the initial thickness. The deformation process also caused the surface area of the fabric to increase by about 50%.

When the knitted fabric was formed into a three-dimensional fiber network, the resulting network retained the soft feel of the knitted fabric while developing cushioning properties very similar to those obtained from a fabric containing only monofilaments. Thus, the network formed in Example 1 is much more suitable for use in applications involving direct skin contact than is the monofilament-only fabric. Such applications include, e.g., ventilating undergarments, padding for orthopedic braces and supports, and cast padding used without a protective stockinet.

EXAMPLE 2

A fabric almost identical to that produced in Example 1 was formed in Example 2, except that in the Example 2 fabric, the cellulose acetate fibers were commercially available fibers impregnated with an antibacterial and antifungicidal agent known under the designation "Microban®". Thus, the resulting three-dimensional fiber network was made antibacterial and antifungicidal.

Example 2 represents a further advantage of the present invention which is that a polyester-containing fabric prepared in accordance with the invention can be impregnated with the Microban antibacterial agent. The Microban antibacterial agent is thermally unstable under the conditions present in polyester fiber manufacturing processes and, thus, the Microban agent can not be added directly to polyesters. In the fabric prepared in Example 2, the Microban agent is not added directly to the polyester fibers but rather to the cellulose acetate fibers. Thus, Example 2 provides a fabric which contains both polyester fibers and the Microban agent.

EXAMPLE 3

A single 0.18 mm diameter white PET monofilament was concurrently knit (as in Example 1) with a 70/33 solution dyed black PET multifilament yarn. The tension on the black yarn was increased so that individual fibers remained more or less coherent, i.e., did not encapsulate the monofilament. The resulting fabric had a thickness of about 0.38 mm and contained 82% by weight of the monofilament and 16% by weight of the multifilament yarn. The fabric appeared black on one side and gray or silvery on the reverse side. In addition to its unusual appearance, the fabric exhibited dramatic side-to-side wicking performance. When exposed to moisture, the small interfilament capillaries of the multifilament yarn pulled moisture away from the monofilament surface. Even when the fabric was saturated, the silvery, monofilament side felt relatively dry.

The fiber network structure formed from the fabric had a thickness of about 4.6 mm, which was a twelve-fold increase over the thickness of the fabric (i.e., 0.38 mm).

EXAMPLE 4

A traditional jersey knit fabric formed from a polyester spun yarn was bonded via lamination to a monofilament knit fabric using a web of melt adhesive in a calendar. The laminate was then subjected to a thermomechanical process using a heated press plate. The press plate was a metallic plate having ⅜ inch diameter holes, and was heated to a temperature of from about 160° C. to about 230° C. The fabric was pressed against the heated plate for about 9 seconds, and pins having a diameter of about ¼ inch and heated to the same temperature as the press plate were then pushed through the holes.

The resulting material had a three-dimensional form and provided excellent cushioning and recovery properties when compressed and released perpendicular to the plane of the original fabric. The material also exhibited excellent wicking character. When the structure was soaked with water, the moisture concentrated in the spun yarn fabric and left the monofilament side of the material feeling dry to the touch. Passing an absorbent paper towel across the monofilament side removed only traces of moisture while rubbing the jersey side of the fabric saturated the towel. Traditional wicking materials such as those available under the designation "Polartec" were found to be significantly inferior with respect to this capability.

What is claimed is:

1. A resilient three-dimensionally shaped fiber network structure comprising at least one sheet of a deformed textile fabric each said sheet defining a base region and also defining a plurality of deformations extending upwardly from said base region to define an original shape and height relative to the remaining base region and which return substantially to their original shape after being compressed to 50% of their height, said deformations being formed as a two-dimensional array on said base region, said deformed textile fabric comprising at least one monofilament and at least one multifilament yarn.

2. A structure according to claim 1, wherein said fabric is a knitted fabric.

3. A structure according to claim 1, wherein said fabric is a woven fabric.

4. A structure according to claim 1, wherein said at least one monofilament has a diameter of at least about 0.10 millimeter.

5. A structure according to claim 4, wherein said at least one monofilament has a diameter of from about 0.10 millimeter to about 1.00 millimeter.

6. A structure according to claim 1, wherein said at least one monofilament comprises a thermoplastic polymer.

7. A structure according to claim 6, wherein said thermoplastic polymer has a melting point of from about 80° C. to about 375° C.

8. A structure according to claim 6, wherein said thermoplastic polymer is selected from the group consisting of polyesters, polyamides, thermoplastic copolyetherester elastomers, polyarylene sulfides, polyolefins, aliphatic-aromatic polyamides, polyacrylates and thermotropic liquid crystalline polymers.

9. A resilient three-dimensionally shaped fiber network structure comprising a deformed textile fabric having a base region and a plurality of deformations which return substantially to their original shape after being compressed to 50% of their height, formed as a two-dimensional array on said base region, said deformed textile fabric comprising at least one monofilament and at least one multifilament yarn, wherein said at least one monofilament comprises a thermoplastic polymer selected from the group consisting of polyethylene, polyethylene terephthalate, polybutylene terephthalate, polypropylene, nylon 6, nylon 66 and thermoplastic copolyetherester elastomers.

10. A resilient three-dimensionally shaped fiber network structure comprising a deformed textile fabric having a base region and a plurality of deformations which return substantially to their original shape after being compressed to 50% of their height, formed as a two-dimensional array on said base region, said deformed textile fabric comprising at least one monofilament and at least one multifilament yarn, wherein said at least one monofilament comprises a thermoplastic polymer further comprising one or more additives selected from the group consisting of flame retardants, spinning lubricants, antibacterial agents and antifungicidal agents.

11. A resilient three-dimensionally shaped fiber network structure comprising a deformed textile fabric having a base region and a plurality of deformations which return substantially to their original shape after being compressed to 50% of their height, formed as a two-dimensional array on said base region, said deformed textile fabric comprising at least one monofilament and at least one multifilament yarn, wherein said at least one multifilament yarn comprises from about 20 to about 200 filaments.

12. A resilient three-dimensionally shaped fiber network structure comprising a deformed textile fabric having a base region and a plurality of deformations which return substantially to their original shape after being compressed to 50% of their height, formed as a two-dimensional array on said base region, said deformed textile fabric comprising at least one monofilament and at least one multifilament yarn, wherein said at least one multifilament yarn has a denier per filament of from about 1 to about 15.

13. A resilient three-dimensionally shaped fiber network structure comprising a deformed textile fabric having a base region and a plurality of deformations which return substantially to their original shape after being compressed to 50% of their height, formed as a two-dimensional array on said base region, said deformed textile fabric comprising at least one monofilament and at least one multifilament yarn, wherein said fabric comprises from about 25% to about 90% by weight of said at least one monofilament and from about 10% to about 75% by weight of said at least one multifilament yarn.

14. A resilient three-dimensionally shaped fiber network structure comprising a deformed textile fabric having a base region and a plurality of deformations which return substantially to their original shape after being compressed to 50% of their height, formed as a two-dimensional array on said base region, said deformed textile fabric comprising at least one monofilament and at least one multifilament yarn, wherein said fabric comprises from about 40% to about 85% by weight of said at least one monofilament and from about 15% to about 60% by weight of said at least one multifilament yarn.

15. A resilient three-dimensionally shaped fiber network structure comprising a deformed textile fabric having a base region and a plurality of deformations which return substantially to their original shape after being compressed to 50% of their height formed as a two-dimensional array on said base region, said deformed textile fabric comprising at least one monofilament and at least one multifilament yarn, wherein each filament in said at least one multifilament yarn comprises a thermoplastic polymer.

16. A structure according to claim 15, wherein said thermoplastic polymer has a melting point of from about 80° C. to about 375° C.

17. A structure according to claim 15, wherein said thermoplastic polymer is selected from the group consisting of polyesters, polyamides, thermoplastic copolyetherester elastomers, polyarylene sulfides, polyolefins, aliphatic-aromatic polyamides, polyacrylates and thermotropic liquid crystalline polymers.

18. A structure according to claim 17, wherein said thermoplastic polymer is selected from the group consisting of polyethylene terephthalate, polybutylene terephthalate, polypropylene, polyethylene, nylon 6, nylon 66 and thermoplastic copolyetherester elastomers.

19. A structure according to claim 15, wherein said thermoplastic polymer comprises one or more additives selected from the group consisting of flame retardants, spinning lubricants, antibacterial agents and antifungicidal agents.

20. A structure according to claim 1, wherein each filaments in said at least one multifilament yarn is a natural fiber.

21. A structure according to claim 20, wherein said natural fiber is a cellulose fiber.

22. A resilient three-dimensionally shaped fiber network structure comprising a deformed textile fabric having a base region and a plurality of deformations which return substantially to their original shape after being compressed to 50% of their height formed as a two-dimensional array on said base region, said deformed textile fabric comprising at least one monofilament and at least one multifilament yarn, wherein each filament in said at least one multifilament yarn is a man-made, wet- or dry-spun, non-thermoplastic fiber.

23. A structure according to claim 1, wherein said deformations include projections extending upwardly from said base region of said deformed textile material in a direction which is substantially perpendicular to a plane of said base region.

24. A structure according to claim 23, wherein said deformations further include depressions extending downwardly from said base region in a direction which is substantially perpendicular to said base region and which is substantially opposite of said direction in which said projections extend.

25. An article comprising the three-dimensionally shaped fiber network structure of claim 1.

26. An article according to claim 25, wherein said article is selected from the group consisting of cushioning materials, impact-absorbing materials, and load-bearing materials.

27. An article according to claim 25, wherein said article is selected from the group consisting of mattresses, athletic shoes, paddings for protective head gear, seat cushions, automobile seats, casts, carpet pads, automobile headliners, protective packagings for electronics, and mattress topper pads.

28. A resilient three-dimensionally shaped fiber network structure comprising at least one sheet of a deformed textile fabric, each said sheet defining a base region and also defining a plurality of deformations extending upwardly from said base region to define an original shape and height relative to the remaining base region, said deformations being formed as a two-dimensional array on said base region, said deformed textile fabric comprising at least one monofilament and at least one multifilament yarn, said at least one monofilament comprising a thermoplastic polymer selected from the group consisting of polyesters, polyamides, thermoplastic copolyetherester elastomers, polyarylene sulfides, polyolefins, aliphatic-aromatic polyamides, polyacrylates and thermotropic liquid crystalline polymers.

29. A three-dimensionally shaped fiber network structure comprising a deformed textile fabric having a base region and a plurality of deformations formed as a two-dimensional array on said base region said deformed textile fabric comprising at least one monofilament and at least one multifilament yarn, said at least one monofilament comprising a thermoplastic polymer selected from the group consisting of polyethylene, polyethylene terephthalate, polybutylene terephthalate, polypropylene, nylon 6, nylon 66 and thermoplastic copolyetherester elastomers.

30. A three-dimensionally shaped fiber network structure comprising a deformed textile fabric having a base region and a plurality of deformations formed as a two-dimensional array on said base region, said deformed textile fabric comprising at least one monofilament and at least one multifilament yam, said at least one multifilament yarn comprising from about 20 to about 200 filaments.

31. A three-dimensionally shaped fiber network structure comprising a deformed textile fabric having a base region and a plurality of deformations formed as a two-dimensional array on said base region, said deformed textile fabric comprising at least one monofilament and at least one multifilament yam, said at least one multifilament yarn having a denier per filament of from about 1 to about 15.

32. A three-dimensionally shaped fiber network structure comprising a deformed textile fabric having a base region and a plurality of deformations formed as a two-dimensional array on said base region, said deformed textile fabric comprising from about 25% to about 90% by weight of at least one monofilament and from about 10% to about 75% by weight of at least one multifilament yarn.

33. A three-dimensionally shaped fiber network structure comprising a deformed textile fabric having a base region and a plurality of deformations formed as a two-dimensional array on said base region, said deformed textile fabric comprising from about 40% to about 85% by weight of at least one monofilament and from about 15% to about 60% by weight of at least one multifilament yarn.

34. A three-dimensionally shaped fiber network structure comprising a deformed textile fabric having a base region and a plurality of deformations formed as a two-dimensional array on said base region, said deformed textile fabric comprising at least one monofilament and at least one multifilament yarn, filaments in said at least one multifilament yam comprising a thermoplastic polymer selected from the group consisting of polyesters, polyamides, thermoplastic copolyetherester elastomers, polyarylene sulfides, polyolefins, aliphatic-aromatic polyamides, polyacrylates and thermotropic liquid crystalline polymers.

35. A structure according to claim 34, wherein said thermoplastic polymer is selected from the group consisting of polyethylene terephthalate, polybutylene terephthalate, polypropylene, polyethylene, nylon 6, nylon 66 and thermoplastic copolyetherester elastomers.

36. A resilient three-dimensionally shaped fiber network structure comprising at least one sheet of a deformed textile fabric, each said sheet defining a base region and also defining a plurality of deformations extending upwardly from said base region to define an original shape and height relative to the remaining base region, said deformations being formed as a two-dimensional array on said base region, said deformed textile fabric comprising at least one monofilament and at least one multifilament yarn, filaments in said at least one multifilament yarn made from a natural cellulose fiber.

37. An article comprised of a resilient three-dimensionally shaped fiber network structure comprising at least one sheet of a deformed textile fabric, each said sheet defining a base region and also defining a plurality of deformations extending upwardly from said base region to define an original shape and height relative to the remaining base region, said deformations being formed as a two-dimensional array on said base region, said deformed textile fabric comprising at least one monofilament and at least one multifilament yarn, said article selected from the group consisting of mattresses, athletic shoes, padding for protective head gear, seat cushions, automobile seats, casts, carpet pads, automobile headliners, protective packagings for electronics, and mattress topper pads.

* * * * *